Sept. 14, 1926.
C. C. TOMKINSON
GROUND ANCHOR
Filed July 10, 1923 2 Sheets-Sheet 1
1,600,020
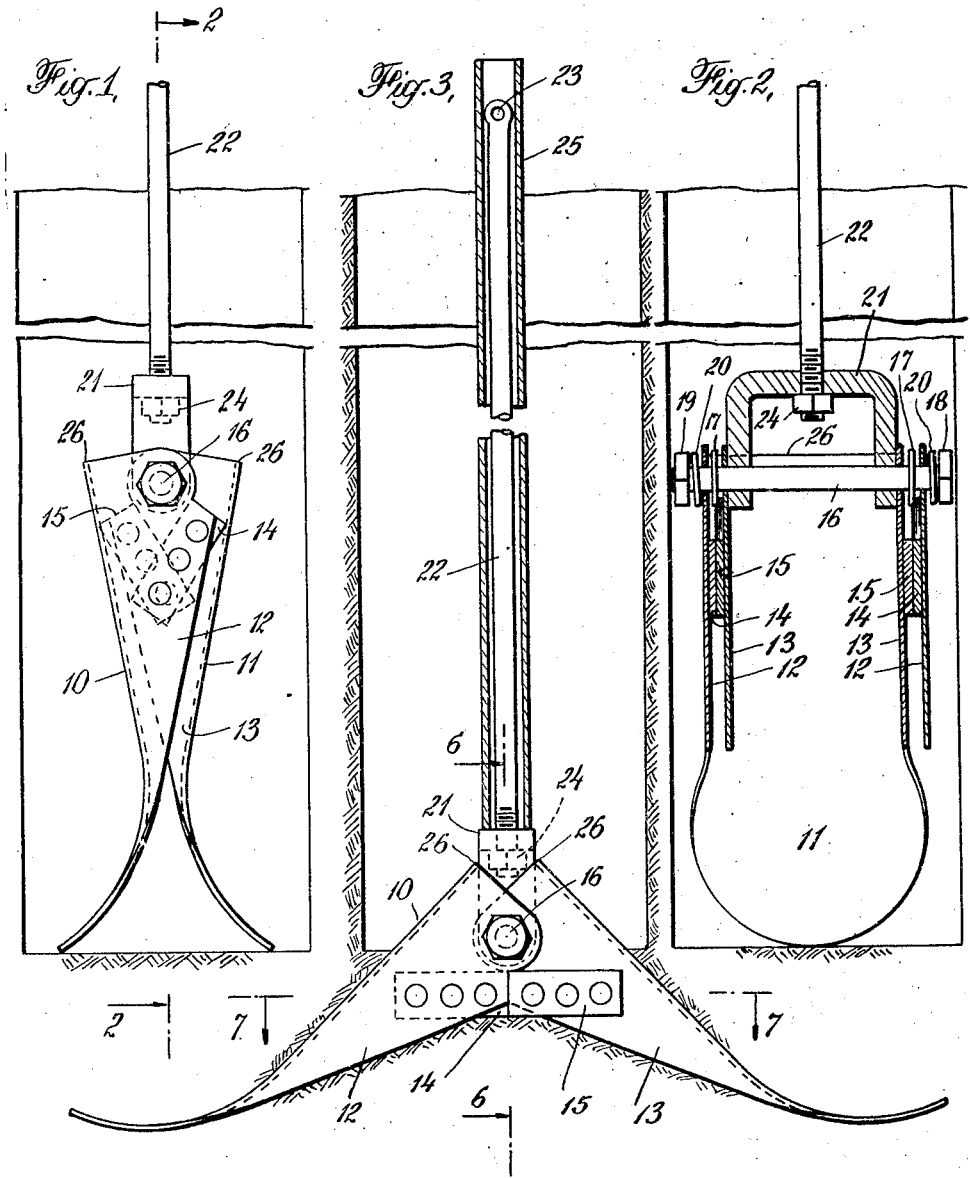

Sept. 14, 1926.
C. C. TOMKINSON
1,600,020
GROUND ANCHOR
Filed July 10, 1923  2 Sheets-Sheet 2
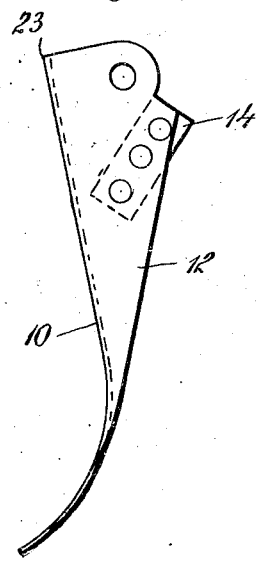
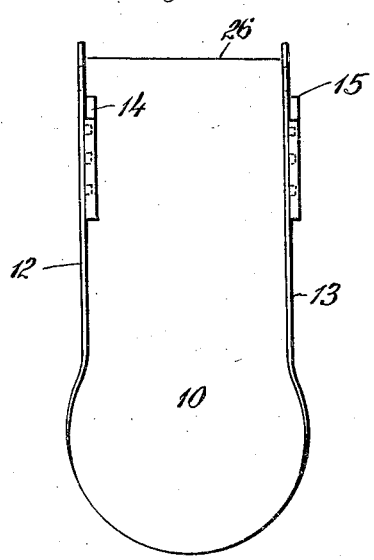
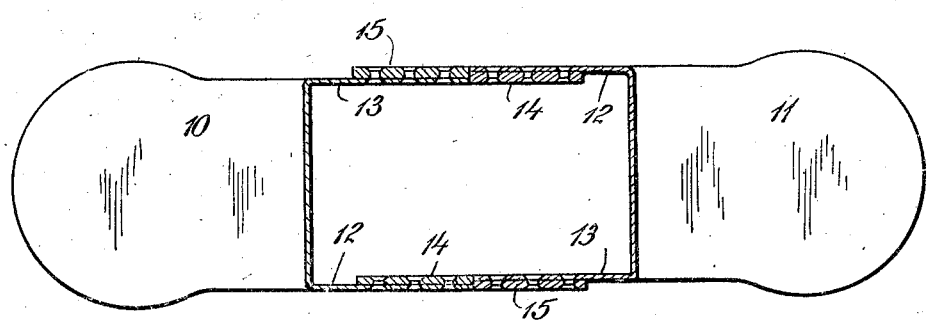
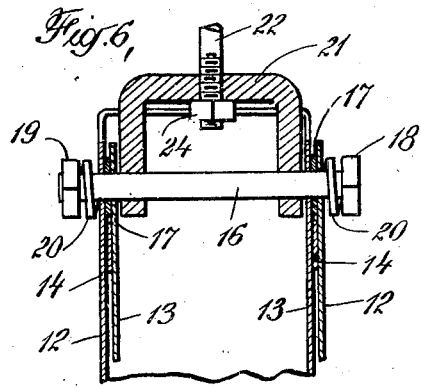
INVENTOR
Charles C. Tomkinson
BY
E. W. Marshall
ATTORNEY Patented Sept. 14, 1926.

1,600,020

UNITED STATES PATENT OFFICE.

CHARLES C. TOMKINSON, OF PLAINFIELD, NEW JERSEY, ASSIGNOR TO JOHN EDWARD OGDEN, OF MOUNTAINVILLE, NEW YORK.

GROUND ANCHOR.

Application filed July 10, 1923. Serial No. 650,586.

This invention relates to ground anchors for use in anchoring guy wires and for like uses.

The invention has for its salient object to provide an anchor of the character described that is simple but rigid in structure, economical to manufacture and effective in operation.

Another object of the invention is to provide an anchor that can be easily and quickly inserted and operated and that will be automatically locked in anchoring position when the anchor has been driven into the ground.

Further objects of the invention will appear from the following description taken in connection with the drawings which form a part of this application and in which, Fig. 1 is an elevational view illustrating the anchor inserted in a hole and showing the anchor before the wings have expanded or spread.

Fig. 2 is a sectional elevation taken substantially on line 2—2 of Fig. 1.

Fig. 3 is an elevational view similar to Fig. 1 but showing the anchor driven into the ground and with the wings spread and locked in operative position.

Fig. 4 is an elevational view of one of the anchor wings or blades.

Fig. 5 is an elevational view taken at right angles to Fig. 4.

Fig. 6 is a sectional elevation taken substantially on line 6—6 of Fig. 3, and

Fig. 7 is a sectional elevation taken substantially on line 7—7 of Fig. 3.

The invention briefly described consists of a ground anchor comprising a pair of wings preferably mounted on a common pivot, a yoke or saddle member pivoted concentric with the wings and projecting portions formed on the wings and adapted to unlock when the wings have been spread or expanded to operative position. A rod is secured to the saddle member and the anchor is driven into the ground by means of blows on a pipe which is inserted over the rod and engages the saddle member. Further details of the invention will appear from the following description.

The anchor particularly illustrated comprises a pair of wings 10 and 11 each wing having longitudinally extending flanges 12 and 13 formed thereon at the side edges thereof. The wings are preferably formed of sheet metal although malleable iron may be used if desired. The flange 12 of each wing has formed thereon on its inner surface an offset or projecting portion 14 and the flange 13 has formed on or secured to its outer surface a corresponding offset portion 15.

The wings are mounted on a common pivot rod 16, this pivot member passing through aligned openings in the flanges 12 and 13. The flanges are disposed in the manner illustrated particularly in Fig. 2 and as shown therein a washer 17 is interposed between the flanges at the two ends of the pivot member. The pivot rod or bolt 16 has a head 18 formed at one end thereof and a nut 19 threaded to the other end thereof and intermediate the head and the outside flange adjacent thereto are interposed spring washers 20.

When the wings are folded or in inoperative position the offset portions 14 and 15 overlap as shown in Figs. 1 and 2.

A saddle member or yoke 21 is mounted on the pivot rod 16 between the inner flanges of the wings and this yoke has threaded thereon and secured thereto a rod 22 which extends in length substantially to the depth of the hole into which the anchor is to be inserted. The upper end of the rod is provided with an eye 23 through which the guy wire may be secured. A nut 24 is threaded on the lower end of the rod 22 for securing the rod against withdrawal from the saddle member or yoke 21.

The wings 10 are longitudinally curved and when folded flare outwardly at the lower ends thereof and when the anchor is to be used it is inserted in a hole with the wings folded and a pipe 25 or a special tool is placed over the rod 22 and engages the yoke or saddle 21. By means of blows delivered on the upper end of the pipe the anchor will be driven down into the ground and because of their longitudinal curvature the wings 10 will be spread and extended to the position shown in Fig. 3. When the wings have reached this position the upper ends 26 thereof will engage the yoke 21 and prevent further spreading and the projections 14 and 15 will be snapped into the same plane as shown in Fig. 7 under the influence of the spring washers 20. It will be noted therefore that wings will lock automatically when they have been spread to expanded position and after they have been locked they cannot thereafter be folded and withdrawn.

From the foregoing description it will be evident that a simple, practical and rugged construction of ground anchor has been designed and that the anchor can be easily and quickly inserted and driven to operative or anchoring position. Furthermore after the wings have been spread the anchor will be securely held against withdrawal.

Although one embodiment of the invention has been particularly illustrated and described, it will be understood that the invention is capable of modification and that changes in the construction and in the arrangement of the various cooperating parts may be made without departing from the spirit or scope of the invention as expressed in the following claims.

What I claim is:—

1. A ground anchor comprising a pair of longitudinally curved wings having longitudinally extending flanges at the side edges thereof mounted on a common pivot, means carried by the wings for automatically locking said members in expanded condition and resilient means engaging the wings for moving the wings to locked position.

2. A ground anchor comprising a pair of longitudinally curved wings having longitudinally extending flanges at the side edges thereof mounted on a common pivot, means including offset portions carried by the wings and resilient washers engaging said wings for automatically locking said members in expanded condition.

3. A ground anchor comprising a pair of wings mounted on a common pivot, a saddle member mounted on said pivot, said wings having portions engageable with the saddle member to limit the spreading movement thereof, and locking means including lugs on the wings and resilient washers engaging said wings for moving the wings to locked position and retaining the wings in spread position.

4. A ground anchor comprising a plurality of pivoted wings and automatically operable means including resilient members operative on the wings for moving the wings to locked position and locking the wings when they have been spread to anchoring position, said wings being mounted on a common pivot.

5. A ground anchor comprising a plurality of pivoted wings, automatically operable means on the flanges of said wings for locking the wings when they have been spread to anchoring position and spring members engaging the wings to insure the locking of the wings.

In witness whereof, I have hereunto set my hand this 5th day of July, 1923.

CHARLES C. TOMKINSON.